(12) United States Patent
Shepherd

(10) Patent No.: US 7,980,208 B2
(45) Date of Patent: Jul. 19, 2011

(54) RECIPROCATING ENGINE

(76) Inventor: Graydon Aubrey Shepherd, Auckland (NZ)

( * ) Notice: Subject to any disclaimer, the term of this patent is extended or adjusted under 35 U.S.C. 154(b) by 0 days.

(21) Appl. No.: 12/695,680

(22) Filed: Jan. 28, 2010

(65) Prior Publication Data

US 2010/0126472 A1 May 27, 2010

Related U.S. Application Data

(62) Division of application No. 10/596,032, filed as application No. PCT/NZ2004/000306 on Nov. 26, 2004.

(30) Foreign Application Priority Data

| Nov. 26, 2003 | (NZ) | 529777 |
| Jan. 22, 2004 | (NZ) | 530735 |
| Sep. 16, 2004 | (NZ) | 535351 |

(51) Int. Cl.
*F01B 15/02* (2006.01)
(52) U.S. Cl. .................. 123/50 R; 123/50 B
(58) Field of Classification Search ............... 123/50 R, 123/50 A, 50 B, 42, 52.2
See application file for complete search history.

(56) References Cited

U.S. PATENT DOCUMENTS

| 1,316,192 | A |   | 9/1919  | Sawyer |  |
|-----------|---|---|---------|--------|--|
| 2,241,910 | A | * | 5/1941  | Hull ............................. 123/50 R |
| 2,332,056 | A | * | 10/1943 | Caldwell ..................... 123/50 A |
| 3,403,508 | A |   | 10/1968 | Kelly |  |
| 4,178,885 | A |   | 12/1979 | Konther et al. |  |
| 4,261,303 | A | * | 4/1981  | Ramsey ....................... 123/50 R |
| 4,425,880 | A |   | 1/1984  | Rochlus |  |
| 4,586,881 | A | * | 5/1986  | Beshore ........................ 417/460 |
| 4,589,328 | A |   | 5/1986  | Irwin |  |
| 4,598,628 | A |   | 7/1986  | Courtright |  |
| 6,032,622 | A |   | 3/2000  | Schmied |  |
| 6,314,923 | B1|   | 11/2001 | Tompkins |  |
| 6,343,575 | B1| * | 2/2002  | Deckard ..................... 123/43 R |
| 6,793,471 | B2|   | 9/2004  | Latyshev |  |
| 2001/0047775 | A1 | | 12/2001 | Schmied |  |
| 2002/0124816 | A1 | | 9/2002  | Schmied |  |

FOREIGN PATENT DOCUMENTS

| DE | 100 19 033 | 10/2001 |
| EP | 0 190 047  | 8/1986  |
| EP | 1 065 358  | 1/2001  |
| GB | 2 338 030  | 12/1999 |
| JP | 59-099037  | 6/1984  |
| JP | 10-089075  | 4/1998  |
| JP | 2001-063939| 3/2001  |
| NZ | 0314617    | 4/1997  |

(Continued)

OTHER PUBLICATIONS

Japanese Patent Office issued a Japanese Office Action dated Dec. 21, 2009, Application No. 2006-541072.

(Continued)

*Primary Examiner* — Michael Cuff
*Assistant Examiner* — Hung Q Nguyen
(74) *Attorney, Agent, or Firm* — Young & Thompson

(57) ABSTRACT

A reciprocating engine (10) operating on the two stroke cycle, comprising a pair of stationary and substantially concentrically aligned mutually opposed pistons (13, 15) and a sleeve (11) adapted to reciprocate about these static pistons. The reciprocating sleeve (11) defining two cavities, each cavity being operatively connected to one of the pistons to define a chamber. The first chamber being a pre-charge chamber (21) and having at least one inlet port (25), and the second chamber being a combustion chamber (19) and having at least one outlet port (35), the two chambers being separated by a pressure operated transfer valve (23). The reciprocating motion of the sleeve (11) can be converted into rotary motion.

15 Claims, 15 Drawing Sheets

FOREIGN PATENT DOCUMENTS

| | | |
|---|---|---|
| RU | 2 137 933 | 9/1999 |
| WO | 83/01978 | 6/1983 |
| WO | 89/07704 | 8/1989 |
| WO | 93/08372 | 4/1993 |
| WO | 00/77366 | 12/2000 |
| WO | 01/34954 | 5/2001 |
| WO | 03/098017 | 11/2003 |

OTHER PUBLICATIONS

Canadian Patent Office issued a Canadian Office Action dated Aug. 17, 2009, Application No. 2,554,583.

Supplemental EP Search Report dated Jul. 2, 2010 from EP04800224.

* cited by examiner

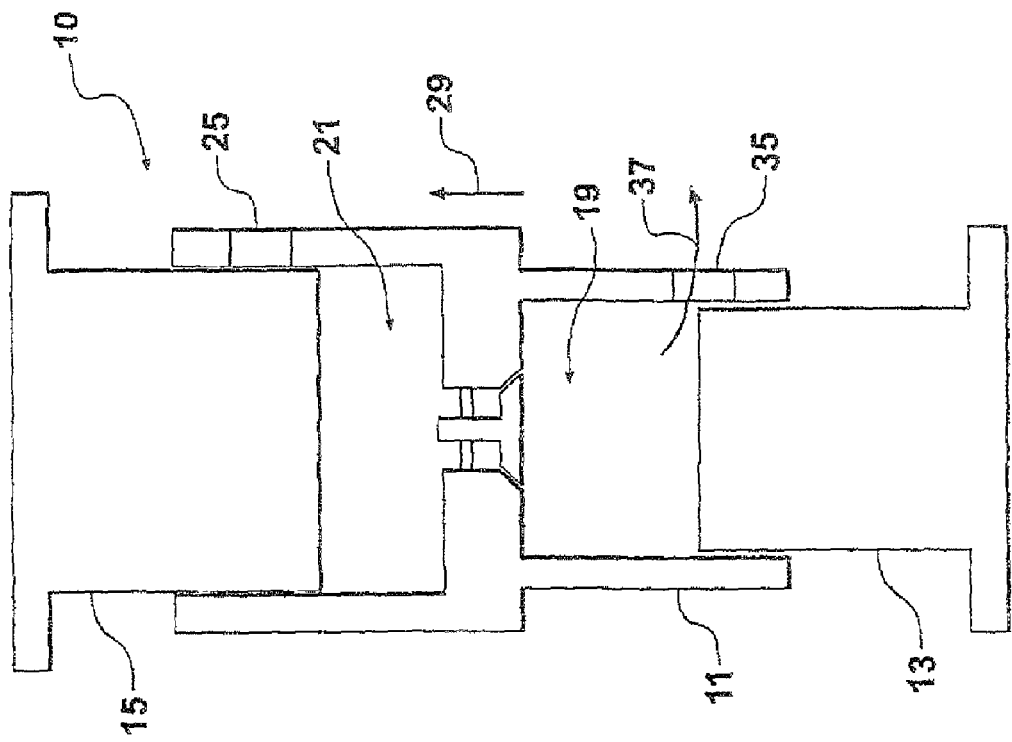
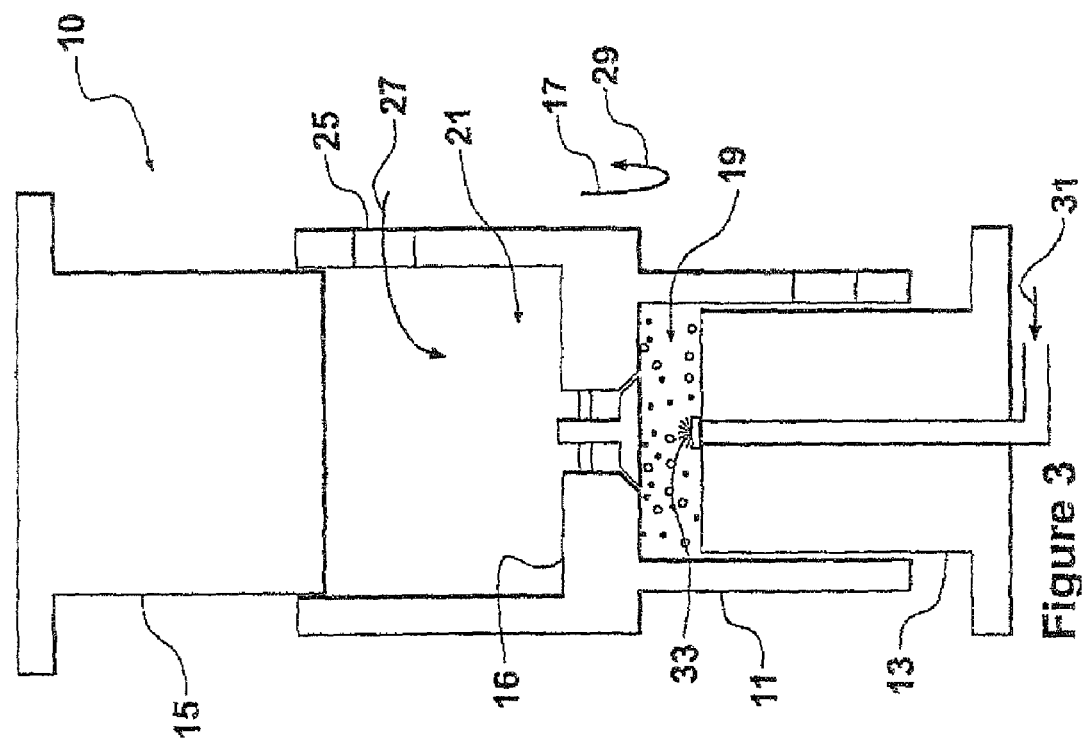

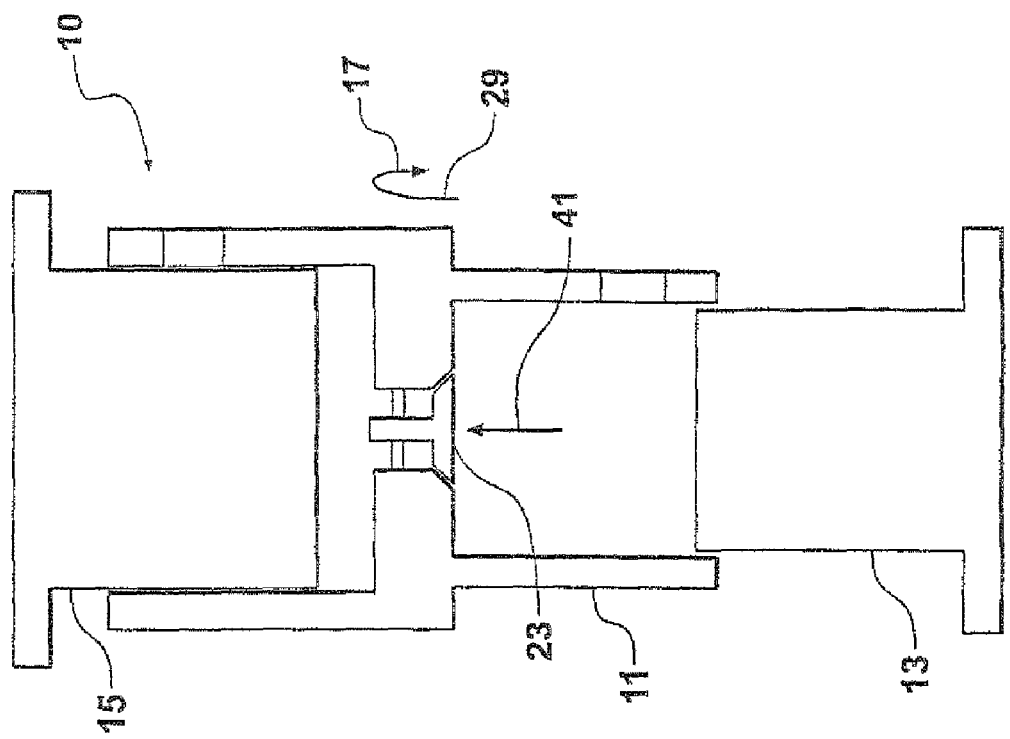
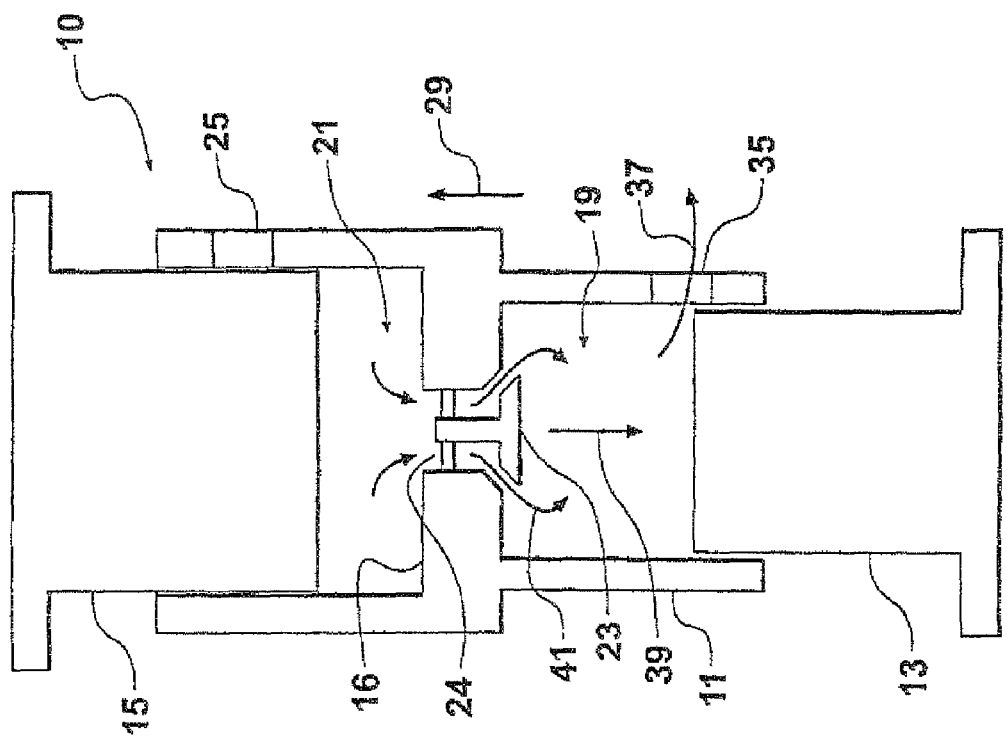

RECIPROCATING ENGINE

FIELD OF THE INVENTION

This invention relates to a reciprocating engine, and in particular, but not exclusively to a crankshaft-less reciprocating sleeve engine.

BACKGROUND

Over the years a great number of reciprocating engines have been developed, each one having advantages or improvements over previous models.

The fossil fuel reciprocating engines have largely used a two or a four stroke cycle. The two stroke cycle engines having the advantage of one power stroke per revolution, as opposed to one power stroke for every two revolutions in the four stroke cycle. However, the two stroke cycle engines have two distinct disadvantages. The first being that their breathing is not always efficient, some unburnt fuel and/or oxygen is lost to the exhaust system, and some exhaust gases remain after the exhaust cycle. And secondly, two stroke engines often require oil to be added to the fuel for lubrication of the crankshaft and piston. Both of these factors combined mean that two stroke engines often produce higher levels of pollution.

A further problem with present technology engines is the conversion of forces felt by the piston into rotary motion. This is traditionally performed using a crank shaft. However, a crankshaft is most efficient when the crank arm is at right angles to the direction of motion of the piston, but is less efficient at other angles. And since the largest forces are felt on the piston around top dead centre, when the crank arm is almost aligned with the direction of motion of the piston, the result is an inefficient transfer of forces into the crank shaft.

OBJECT

It is therefore an object of the present invention to provide a reciprocating engine which will at least go some way towards overcoming the above mentioned problems, or at least provide the public with a useful choice.

STATEMENTS OF THE INVENTION

Accordingly, in a first aspect, the invention may broadly be said to consist in a reciprocating engine operating on the two stroke cycle, comprising;
a pair of stationary and substantially concentrically aligned mutually opposed pistons separated by a sleeve adapted to reciprocate about the pistons, the reciprocating sleeve defining two cavities, each cavity being operatively connected to one of the pistons to define a chamber, the first chamber being a pre-charge chamber and having at least one inlet port, and the second chamber being a combustion chamber and having at least one outlet port, the two chambers being separated by a transfer valve.

Those skilled in the art will appreciate the advantages of this reciprocating engine. The pre-charge chamber can have a greater volume than the combustion chamber, allowing the possibility of improved flushing of exhaust gases from the combustion chamber and/or supercharging of the combustion chamber. In addition, it is possible to oil the piston rings via fixed passageways eliminating the requirement to add oil to the fuel.

Preferably the sleeve is provided with a drive member that is adapted to act upon a track on an output member adjacent to the sleeve, the track defining a path such that when the drive member acts upon the track the reciprocating motion of the sleeve causes rotary motion of the output member. Such an engine is not limited by the constraints imposed by the circular motion of a crankshaft. An engine having a crankshaft is limited in that the majority of the power is extracted from a cylinder while the throw of the crankshaft is between the two o'clock and four o'clock positions. In contrast the engine of the present invention is able to extract power efficiently from the reciprocating sleeve throughout a greater range of movement of the sleeve.

Preferably the output member comprises a rotatable sleeve adapted to rotate about the reciprocating sleeve. Such an arrangement is particularly compact and the power output from the engine can be directly applied to a load, for example to a wheel or to a propeller hub.

While the output member can have a single peaked curved track, preferably the output member has a multi-peaked curved track such that it takes more than one complete cycle of the reciprocating sleeve to produce one revolution of the output sleeve. In some applications it may be an advantage to have an engine with a high torque but low revolutions per minute, for example an engine requiring 12 cycles of the reciprocating sleeve to produce one revolution of the output sleeve. Such an engine can be useful to drive a ships propeller at an appropriate speed without the need for a reduction gearbox.

While the transfer valve can be mechanically operated, preferably the transfer valve is pressure operated. Such a valve arrangement has at least two advantages. Firstly, it eliminates the requirement for additional mechanisms which can cause an associated power loss and can require additional maintenance. And secondly, the arrangement can improve the breathing of the engine since the valve can be adapted to open as soon as the pressure in the pre-charge chamber exceeds the pressure in the combustion chamber which is desirable to promote a one way flow of air from the pre-charge chamber to the combustion chamber.

Preferably the inlet port for the pre-charge chamber is provided with a pressure operated valve. Such an arrangement has similar advantages to the pressure operated transfer valve.

Preferably the outlet port for the combustion chamber comprises a port in the reciprocating sleeve which is so sized and positioned that the port can be closed by a piston during at least part of the travel of the reciprocating sleeve.

Such a system of porting and valves described above means that the engine can operate without the need for a drive train of any sort to operate valves.

Preferably the engine comprises a reciprocating sleeve adapted to reciprocate about two pairs of pre-charge chambers and combustion chambers. Such a configuration has the advantage that while the reciprocating sleeve is being moved during the power stroke of one pre-charge chamber/combustion chamber pair, the reciprocating sleeve can at the same time be drawing a fresh charge of air into the pre-charge chamber of the other pair.

Preferably the engine includes two reciprocating sleeves, and more preferably the engine is configured such that each reciprocating sleeve operates in a mutually opposing direction to the other. Such an arrangement can provide improved engine balancing.

In a second aspect, the invention may broadly be said to consist in a vehicle or craft incorporating a reciprocating engine substantially as specified herein.

DESCRIPTION

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

A number of preferred forms of the invention will now be described, by way of example only, with reference to the accompanying drawings in which, FIG. 1 is a schematic diagram showing the operation of the reciprocating engine cycle with the combustion chamber in the compression phase, FIG. 2 is a schematic diagram showing the operation of the reciprocating engine cycle with the combustion chamber continuing in the compression phase, and air beginning to enter the pre-charge chamber, FIG. 3 is a schematic diagram showing the operation of the reciprocating engine cycle at the stage where fuel is introduced and ignition occurs, and the power stroke begins, FIG. 4 is a schematic diagram showing the operation of the reciprocating engine cycle towards the end of the power stroke and when the exhaust gases begin to exit the combustion chamber, FIG. 5 is a schematic diagram showing the operation of the reciprocating engine cycle at the point at which the inlet valve opens to allow a charge of fresh air to transfer from the pre-charge chamber to the combustion chamber, and to complete the purging of the exhaust gases, FIG. 6 is a schematic diagram showing the operation of the reciprocating engine cycle at the stage where the inlet valve closes and the reciprocating sleeve changes direction to begin the compression stroke, FIG. 7 is a schematic diagram of the reciprocating engine showing the conversion of the reciprocating motion of the reciprocating sleeve into rotary motion using a crank shaft, FIG. 8 is a schematic diagram of the reciprocating engine showing the conversion of the reciprocating motion of the reciprocating sleeve into rotary motion using a drive roller which acts on a curved track on an output member.

FIG. 9 is a cross sectional view of an opposed twin reciprocating sleeve engine, FIG. 10 is a cross sectional perspective view of the opposed twin reciprocating sleeve engine, FIGS. 11 to 15 are perspective views progressively showing the build up of the opposed twin reciprocating sleeve engine, FIG. 16 is a schematic view of the engine in a marine application, and FIG. 17 is a perspective view of a gearing arrangement which can be used to alter the output drive-shaft speed.

Figure 1:
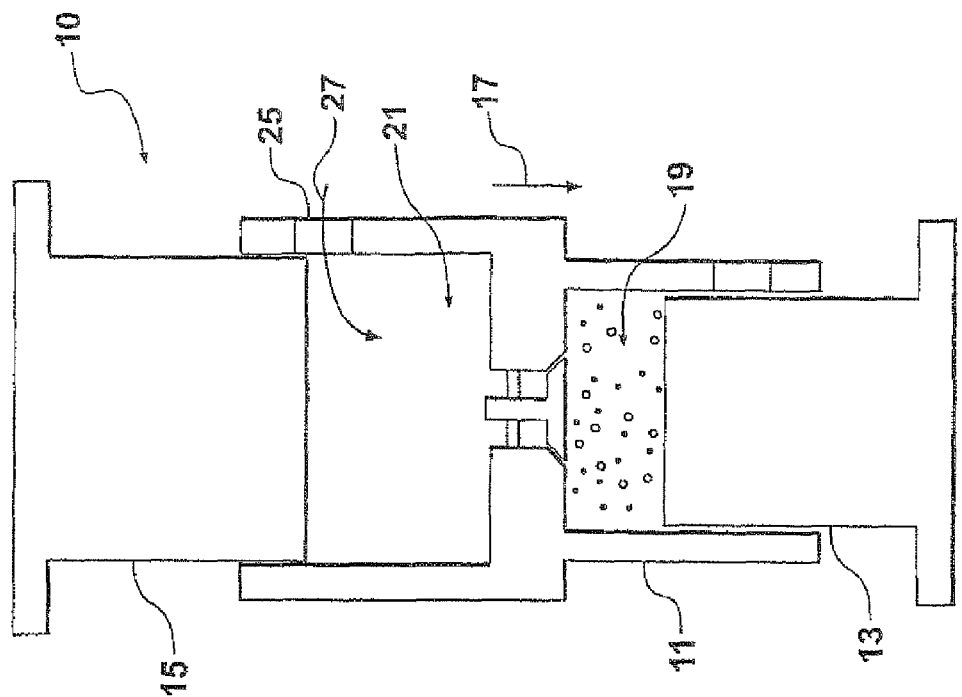

With reference to FIG. 1, a reciprocating engine (10) is shown comprising at least a reciprocating sleeve (11), a first static piston (13) and a second static piston (15). The reciprocating sleeve (11) comprises two cylindrical portions, each of which can have a different diameter as shown, and these two cylindrical portions are separated by an intermediate bulkhead (16).

The reciprocating sleeve (11) is shown moving in a compression stroke direction (17), and is causing the gases in a combustion chamber (19) to be compressed. A partial vacuum is being created in a pre-charge chamber (21).

A transfer valve (23) is used to control the flow of gases through a passage (24) in the intermediate bulkhead (16). The transfer valve (23) is a one way valve, and while not shown, is biased closed by a light spring. At the stage of the operating cycle of the engine (10) shown, the transfer valve (23) is closed.

The FIGS. 2 to 6 continue from FIG. 1 to show one complete cycle of the reciprocating engine (10).

Figure 2:
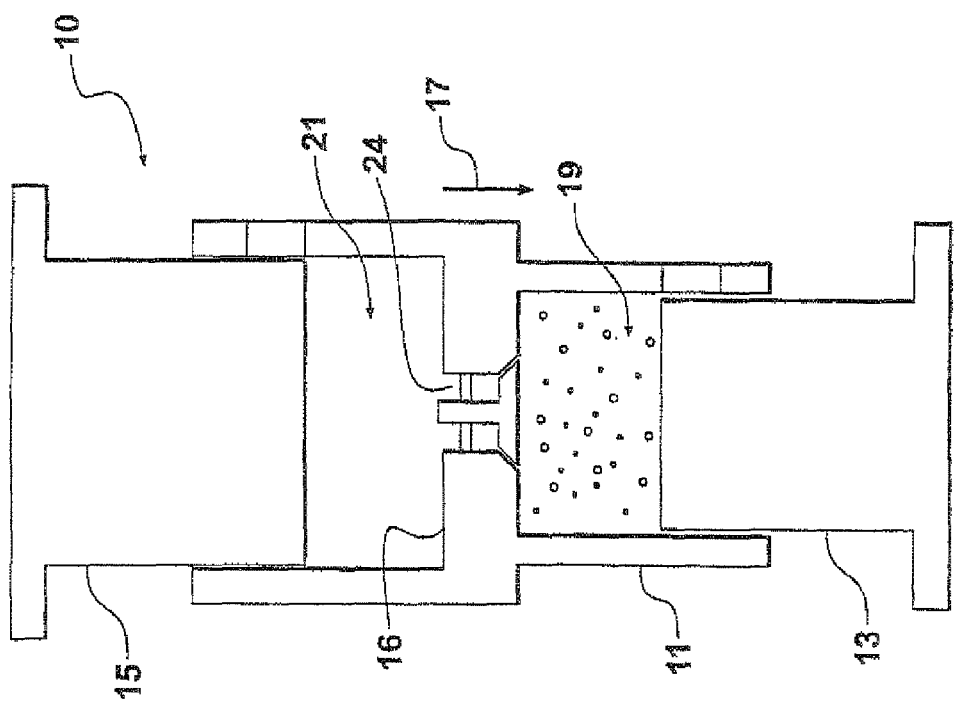

With reference to FIG. 2, the engine (10) is shown with the reciprocating sleeve (11) continuing to move in. the compression. stroke direction (17). The gases in the combustion chamber (19) are continuing to be compressed. At this stage, an inlet port (25) is no longer covered by the second piston (15) and air is able to be drawn in a direction (27) into the pre-charge chamber (21).

With reference to FIG. 3, the engine (10) is shown with the reciprocating sleeve (11) reaching the extent of its travel in the compression stroke direction (17), and beginning to move in the opposite direction, represented as a power stroke direction (29). At this point the gases in the combustion chamber (19) are fully compressed. Diesel fuel (31) is injected at an appropriate time into the combustion chamber (19) and self ignites due to the pressure within the cylinder. The burning fuel and compressed gases expand to push against the intermediate bulkhead (16) and to move the reciprocating sleeve (11) in the power stroke direction (29).

With reference to FIG. 4, the engine (10) is shown with the reciprocating sleeve (11) moving in the power stroke direction (29) and completing the power stroke. The gases in the combustion chamber (19) are completing their combustion and expansion. The exhaust port (35) is no longer fully covered by the first piston (13) and is allowing the burnt or exhaust gases to begin to escape in a direction (37).

The pre-charge gases in the pre-charge chamber (21) are being compressed, the inlet port (25) now being covered by the second piston (15).

With reference to FIG. 5, the engine (10) is shown with the reciprocating sleeve (11) having moved a little further in the power stroke direction (29). At this stage a significant proportion of the burnt gases have left the combustion chamber (19). The velocity and momentum of the exhaust gases leaving the combustion chamber (19) will also tend to draw out or scavenge the combustion chamber, further dropping the pressure. When the pressure within the pre-charge chamber (21) is greater than the pressure within the combustion chamber (19), the transfer valve (23) will be caused to move in a direction (39) and to open the passage (24). This allows the compressed gases in the pre-charge chamber (21) to move in a direction (41) and to rapidly purge the combustion chamber (19) and fill it with a charge of fresh air while the remaining exhaust gases are being drawn out the exhaust port.

It can be an advantage to have the diameter of the pre-charge chamber (21) greater than that of the combustion chamber (19) as this gives the opportunity to provide improved purging of the combustion chamber (19), and/or the possibility of supercharging the combustion chamber (19).

With reference to FIG. 6, the engine (10) is shown with the reciprocating sleeve (11) reaching the full extent of its movement in the power stroke direction (29), and beginning to move again in the compression stroke direction (17). When the gases have largely transferred out of the pre-charge chamber (21) and into the combustion chamber (19), the transfer valve (23) will move in a direction (41) to close.

The cycle then continues as described above with reference to FIG. 1, and so on.

Figure 7:
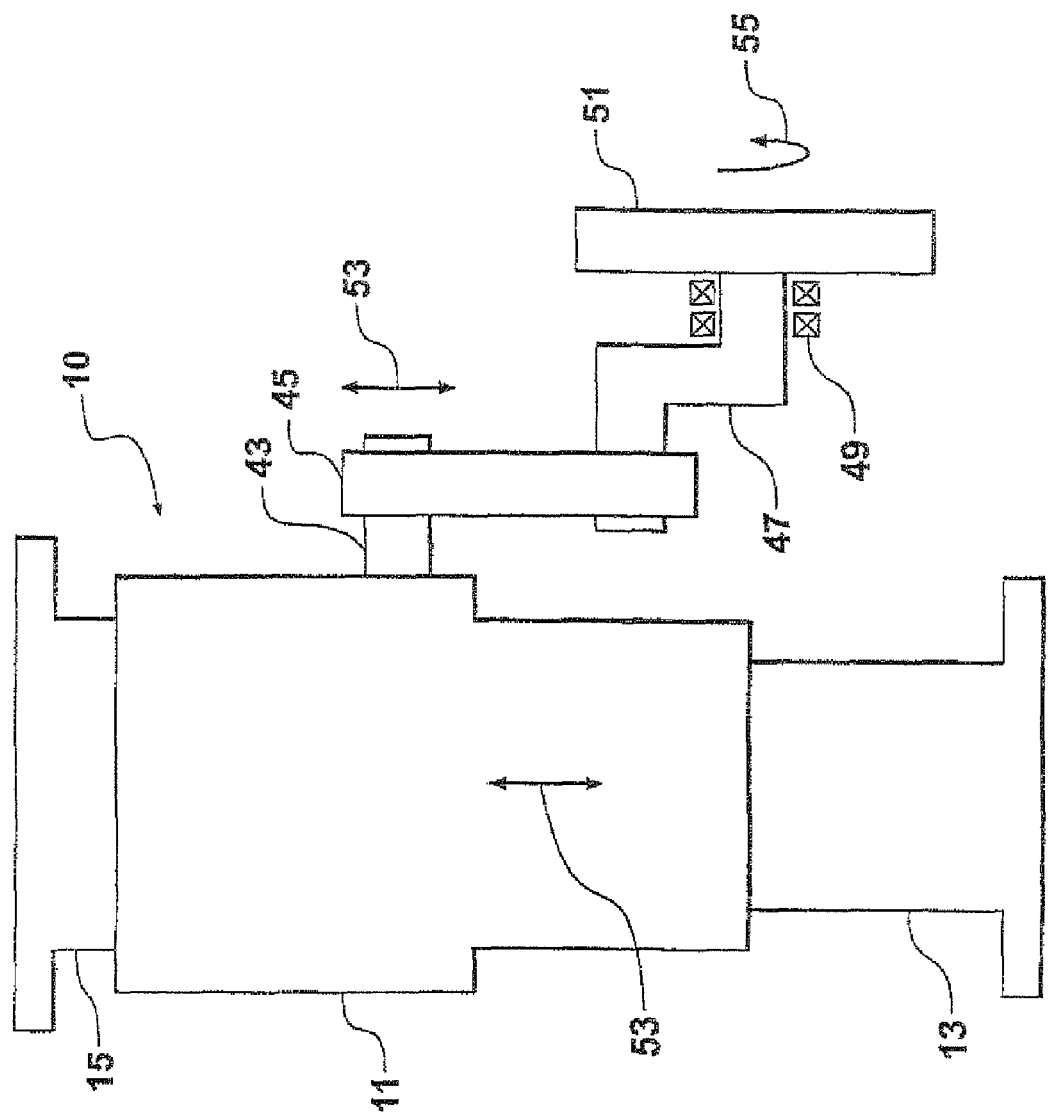

With reference to FIG. 7, a more complete example of the reciprocating engine (10) is shown. In this example the reciprocating sleeve (11) is shown connected via a short pin (43) to a connecting rod (45) which is in turn connected to a crank shaft (47). The crankshaft (47) is supported on bearings (49), and has a flywheel (51) mounted on it.

The reciprocating motion (53) is converted iota rotary motion (55). Some of the energy transferred into the flywheel (51) during the power stroke is used in turn to move the reciprocating sleeve (11) during the compression stroke, allowing the cycles of the engine to be continued. Clearly the crankshaft (47) could also include an output shaft or a drive surface.

Figure 8:
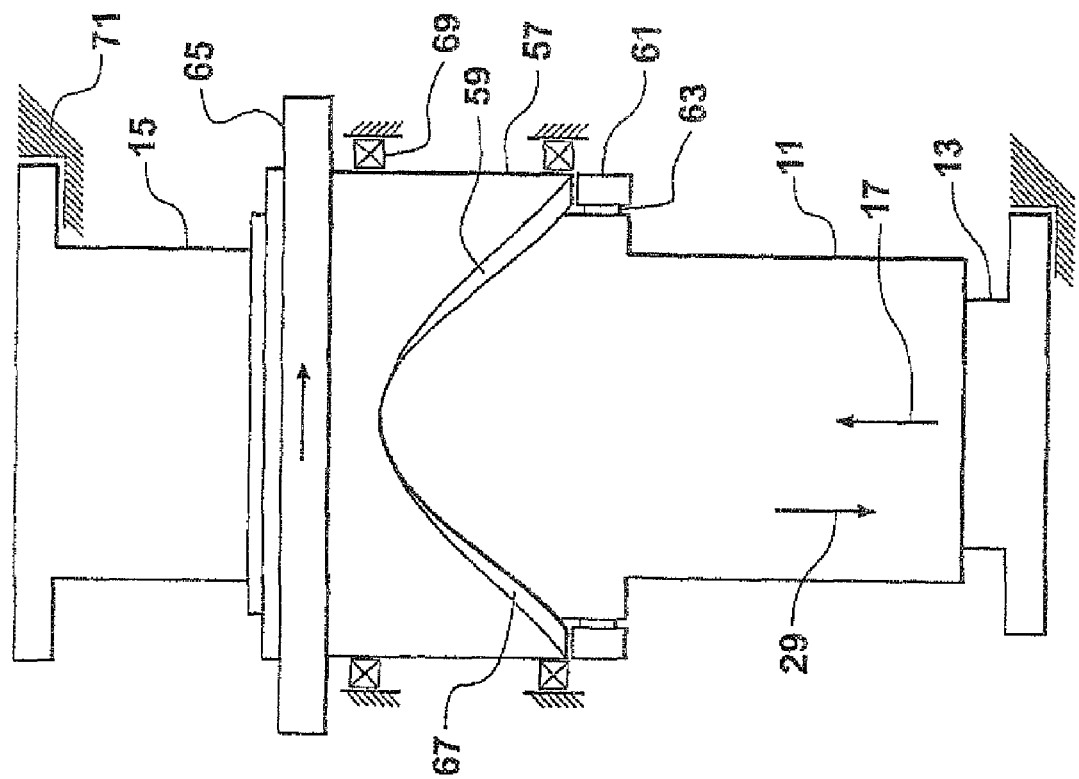

With reference to FIG. 8, another example of a more complete reciprocating engine is shown. In this case the crank shaft is replaced by an output sleeve (57) in the form of a short steel tube having a curved track (59) formed on one end. A roller (61) is supported on a radially aligned pin (63) which is attached to the outer diameter of the reciprocating sleeve (11). As the reciprocating sleeve (11) moves in the power stroke direction (17), the roller (61) acts against the curved track (59) causing the output sleeve (57) to rotate. A technical name for the curved track (59) on the end of the output sleeve (57) is an end cam.

The curved track (59) is at a constant radius from the principal axis of the output sleeve (57), and the curved track (59) includes four points of inflexion having two peaks separated by two troughs. The curved track (59) can have a sinusoidal or similar profile.

The curved track (59) is somewhat similar to a cam profile, although the principle of operation of the drive roller (61) and the curved track (59) is opposite in manner to the operation of a cam profile. That is, the reciprocating motion of a drive roller (61) acting on the curved track (59) produces a rotating motion in the output sleeve (57), as opposed to a cam which generally uses rotating motion to produce reciprocating motion in a second object in contact with the cam.

As the output sleeve (57) is caused to rotate by the drive roller (61) energy is transferred into a flywheel (65). Stored energy within the flywheel (65) causes the output sleeve (57) to continue to rotate and in turn the continuation (67) of the curved track moves the roller (61) in the direction opposite to the direction (17). This action causes the reciprocating sleeve (11) to move in the compression stroke direction (29). The configuration as shown in this figure has the advantage that it has two power strokes per revolution of the output sleeve (57). Different curved track profiles having more than two peaks or lobes can be used to provide more than two power strokes per revolution. A single peak could be used but dynamic balancing could be a problem.

In this example the output sleeve (57) is mounted on a set of bearings (69). Clearly the output sleeve (57) could also include an output drive gear or a drive surface.

It is considered advantageous that the torque from the engine is generated on a curved track (59) which is situated on an output sleeve (57) which surrounds the static sleeve which contains the reciprocating sleeve. The reason being that the forces from the reciprocating sleeve (11) during the power stroke can be transmitted via the pins (63) out through slots in the static tube, to the radius of the curved track (59), and the greater the radius the greater the torque produced in the output sleeve (57) as the drive rollers (61) pushes against the curved track (59). Clearly the greater the radius of the output sleeve (57), the slower the output sleeve (57) will rotate, but in situations where a high torque output is required at a relatively low rotational speed, this feature can be advantageous, and can eliminate the requirement for reduction gearing. A greater radius also allows for a greater number of lobes and more power strokes per revolution.

An engine having a crank shaft by comparison has. a maximum crankshaft radius that is limited by the stroke of the engine, which can limit the maximum torque capability.

The use of a drive roller (61) acting on a curved track (59) is also advantageous in that the curved track can have almost any desired profile to suit the forces being applied by the reciprocating sleeve (11) during each stage of the combustion stroke. By contrast a two stroke engine having a crankshaft is limited to effective crank angles between only the two o'clock and the four o'clock positions, that is, for only 60 degrees out of each 360 degrees of rotation. A single cylinder four stoke engine is effectively half of this. The curved track of the present invention could be configured to allow effective translation of linear force into rotational torque for more than 60 degrees as the drive roller (61) acts against the slope of each peak on the curved track (59), And since the curved track (59) can have at least two peaks, the engine can be efficiently translating linear force into rotational torque for more than 120 degrees (2 times 60) out of each 360 degrees of rotation.

In both FIGS. 7 and 8 the first and second pistons (13) and (15) and the outer races of the bearings (49) and (69) are shown as being fixed relative to one another, by the use of a symbol (71) as illustrated in these figures.

FIGS. 9 to 15 show a more complex version of the reciprocating engine in the form of an opposed twin reciprocating sleeve engine (73) which incorporates a pair of assemblies substantially as outlined with reference to FIG. 8, but having a single output sleeve with a curved track at each end.

Figure 9:
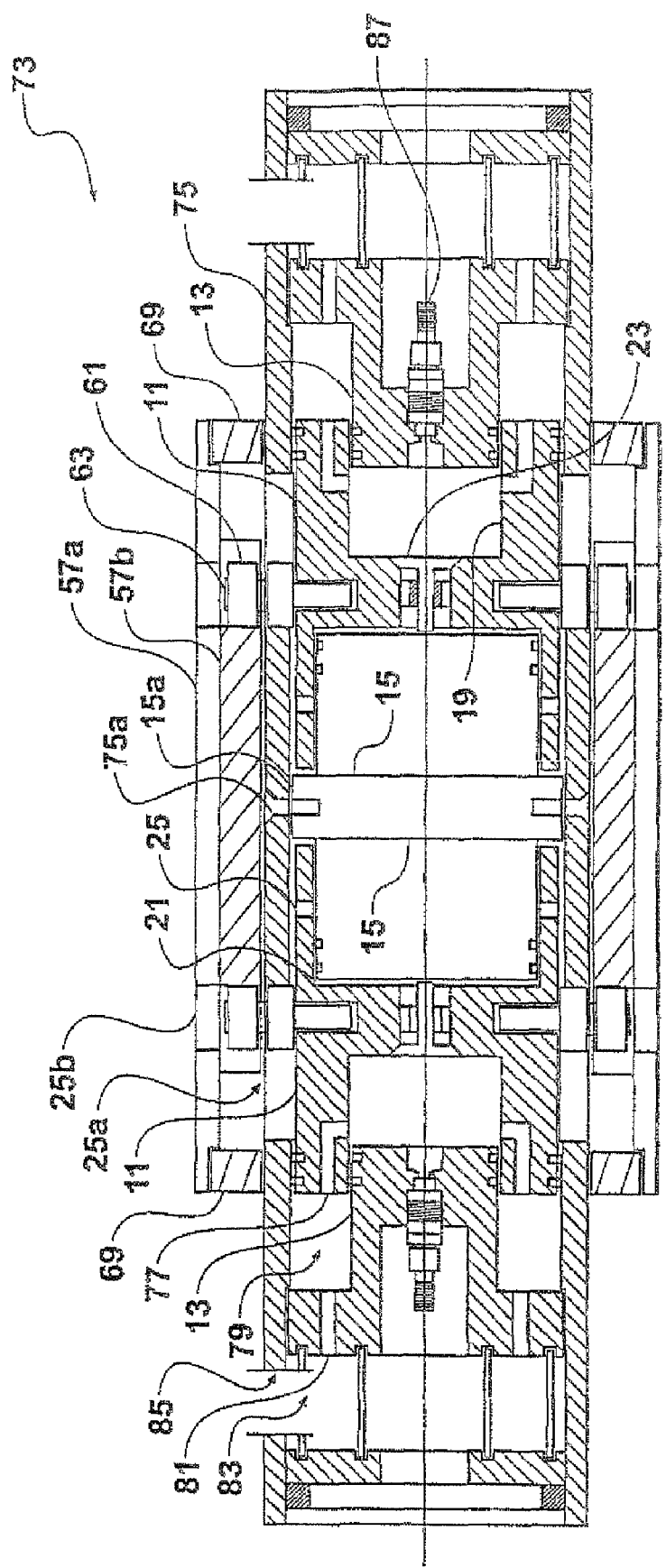
Figure 10:
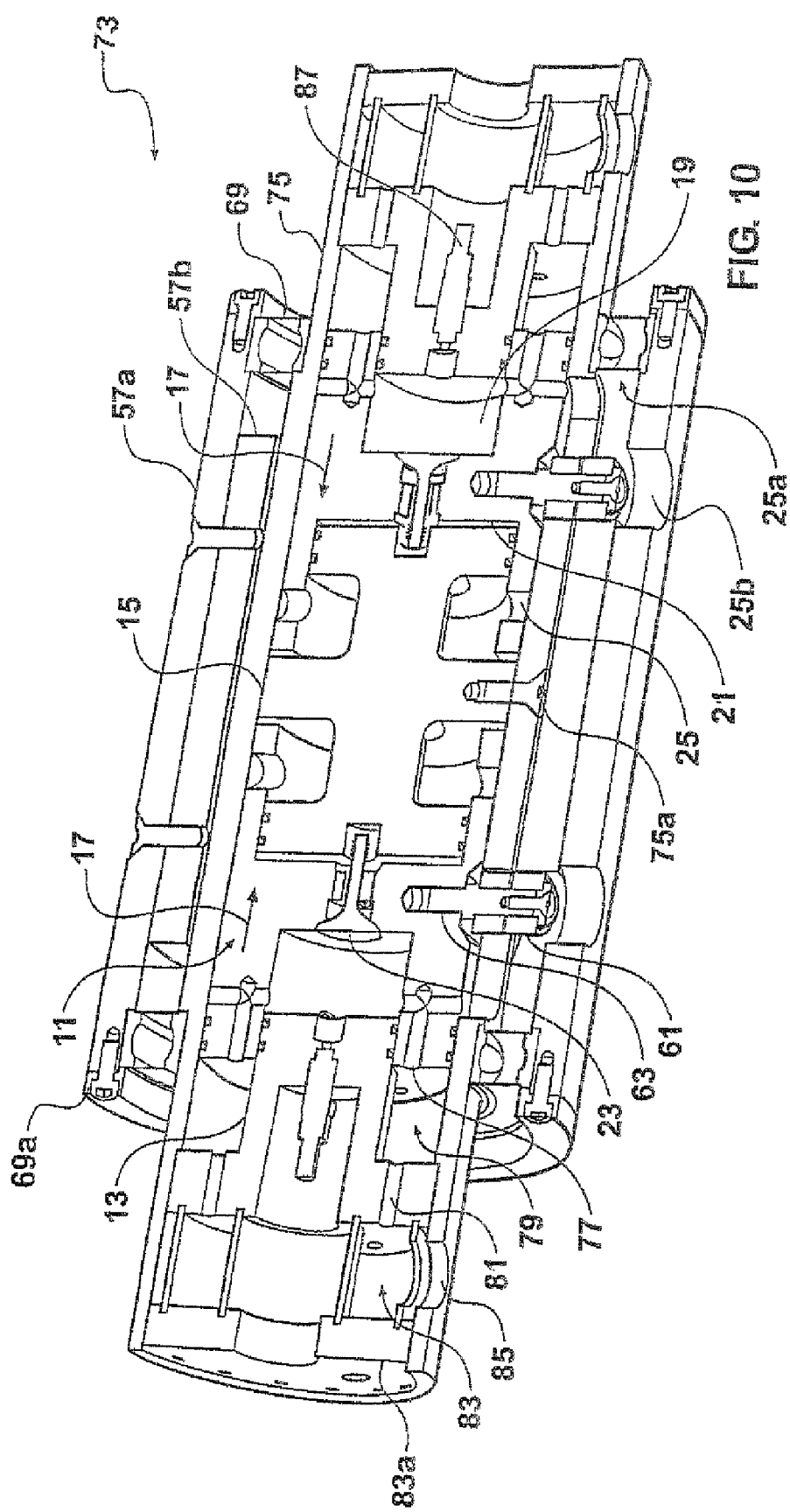

With reference to both FIGS. 9 and 10 the opposed twin reciprocating sleeve engine (73) is shown in cross section. This opposed twin reciprocating sleeve engine (73) has two reciprocating sleeves (11), two first pistons (13) and two second pistons (15), and each set of these is arranged in line and in an opposing manner. The opposing operation is intended to reduce vibration or to improve the dynamic balance of the engine (73) when operating.

The engine (73) is given structure or support by the incorporation of a static sleeve (75). The reciprocating sleeves (11) operate within the static sleeve (75) and the output sleeve (57a and 57b) operates about the static sleeve (75) and is supported on the bearings (69). The reciprocating sleeves (11) are prevented from rotating by the pins (63) which operate within longitudinally aligned slots in the static sleeve (75). Additional bearings can be included on the pins (63) to reduce friction against the sides of the longitudinally aligned slots. The longitudinally aligned slots can be sized to help prevent the drive rollers leaving the curved track (59).

In this example the output sleeve (57a and 57b) is manufactured in two portions, the inner portion (57b) having curved tracks at each end, and the outer portion (57a) being adapted to mate with the outer races of the bearings (69). The first and second pistons (13 and 15) are held fixed within the static sleeve (75). A screw (75a) secures the second piston (15) to the static sleeve (75).

It can be seen that the two second pistons (15) are formed by different constructions between FIG. 9 and FIG. 10, however these changes are simply manufacturing variations and do not affect the operation of the engine (73). Similarly FIG. 10 shows the use of a bearing retaining ring (69a) which is optional and is not used in FIG. 9. Other minor variations also exist between the engines shown in FIGS. 9 and 10 but these do not significantly affect the operation of the engine.

Inlet air enters the inlet chamber (21) via the inlet port (25) which is in communication with the two ports (25a and 25b).

The exhaust gases are able to escape through an exhaust passage (77) into an exhaust intermediate chamber (79). The pressure within the exhaust gases as they escape can assist in pushing on the reciprocating sleeve (11). The exhaust gases then pass through an intermediate exhaust port (81) and into a final chamber (83) before exiting out a final exhaust port (85).

A diesel injector (87) is provided to inject diesel directly into the combustion chamber (19) when required.

As with the engine (10) shown in FIG. 8 a roller (61) is supported on each reciprocating sleeve (11) by a pin (63). During the power stroke of the engine (73) the reciprocating sleeves (11) act to push the rollers (61) against the curved tracks on each end of the inner portion of the output sleeve (57*b*), causing the output sleeve (57*a* and 57*b*) to rotate. Momentum in the output sleeve (57*a* and 57*b*) and in any flywheel to which it may be coupled, causes the output sleeve (57*a* and 57*b*) to continue to rotate and the interaction of the curved tracks with the rollers (61) then causes the reciprocating sleeves (11) to move in a compression stroke direction (17). This operating cycle is the same as that described with reference to FIGS. 1 to 6 above, but in this case is occurring in the opposing twin reciprocating sleeves simultaneously, but in opposite directions.

FIGS. 11 to 15 show a progressive build-up of the opposed twin reciprocating sleeve engine (73) by way of further explanation.

Figure 11:
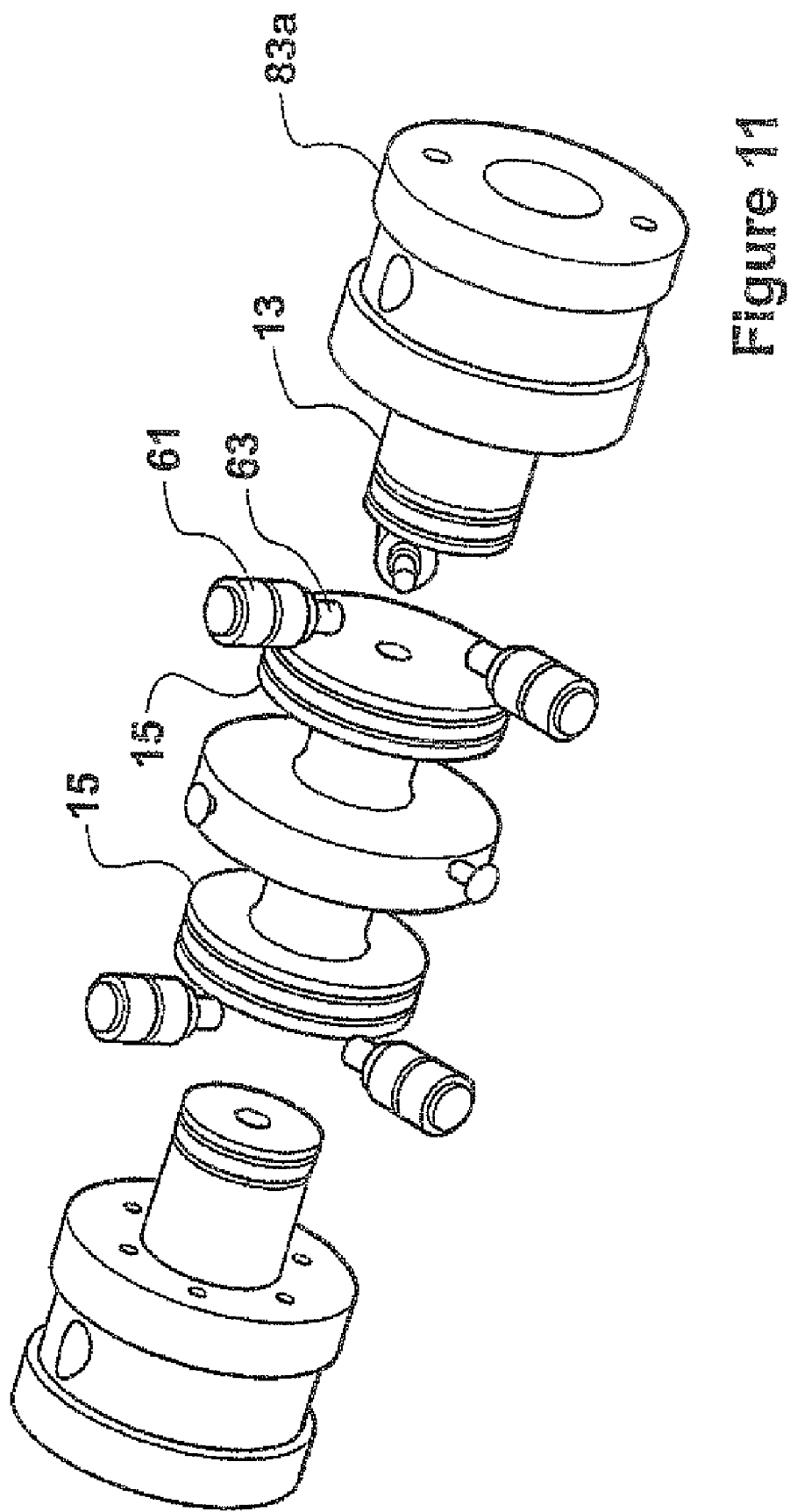

With reference to FIG. 11 the first and second pistons (13) and (15) are shown correctly orientated, as are the rollers (61) and the pins (63). The first pistons (13) are also shown incorporating a final exhaust chamber end fitting (83*a*).

Figure 12:
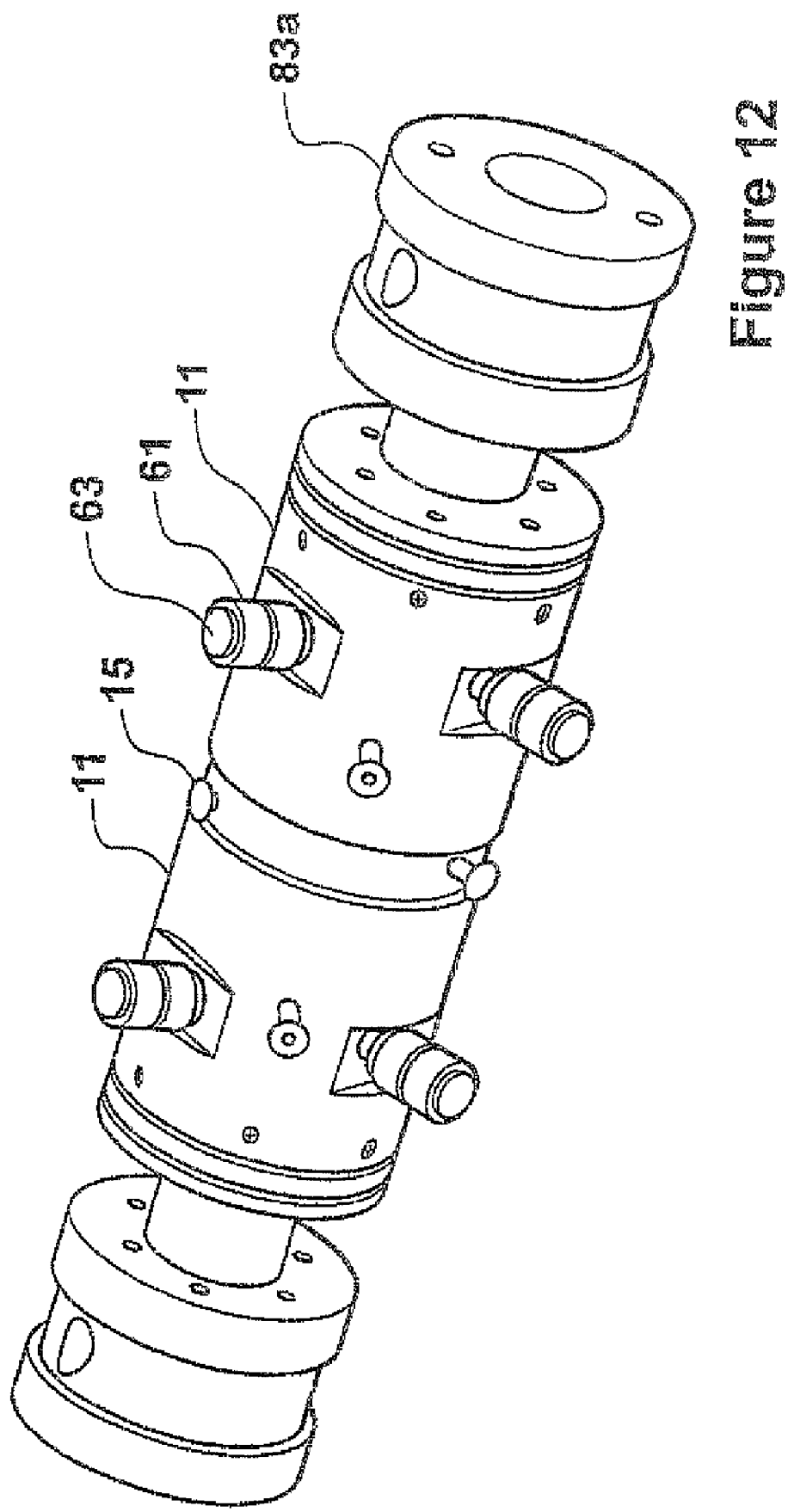

With reference to FIG. 12 the reciprocating sleeves (11) are shown fitted about the pistons (13) and (15).

Figure 13:
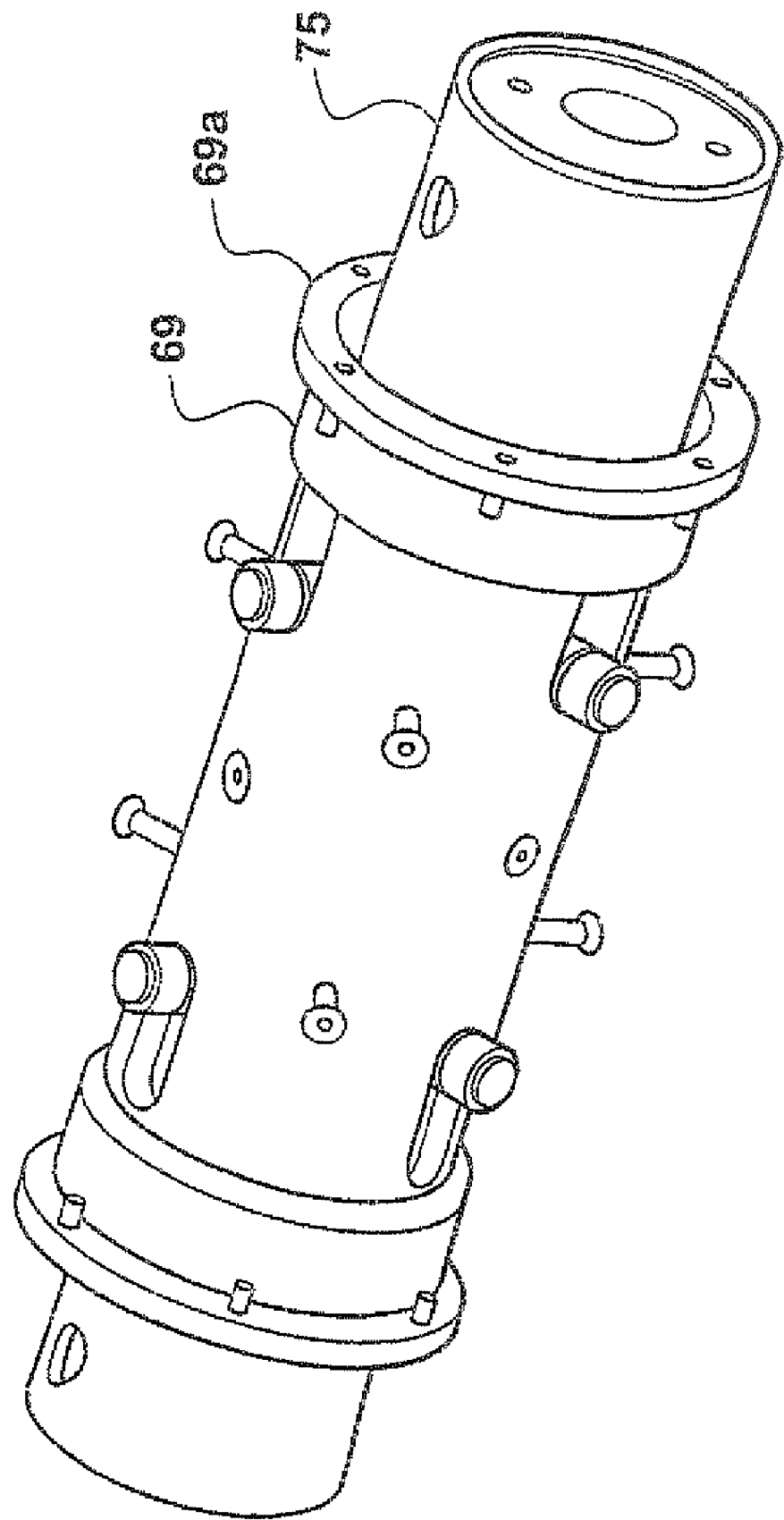

With reference to FIG. 13 the static sleeve (75) is shown fitted, as are the bearings (69) and the bearing retaining rings (69*a*).

Figure 14:
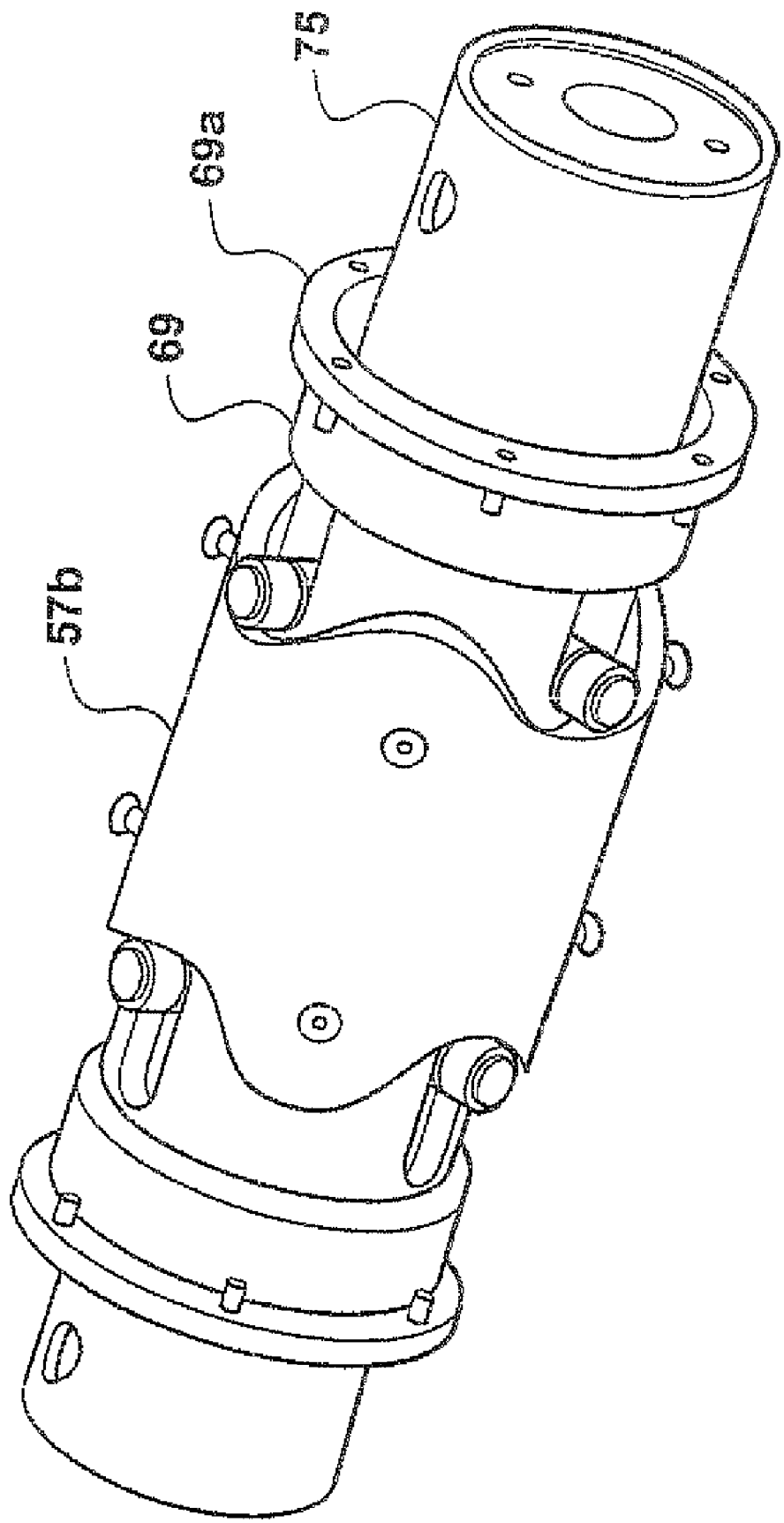

With reference to FIG. 14 the inner portion of the output sleeve (57*b*) is shown installed. In this view the curved track at each end of the sleeve (57*b*) are clearly shown.

Figure 15:
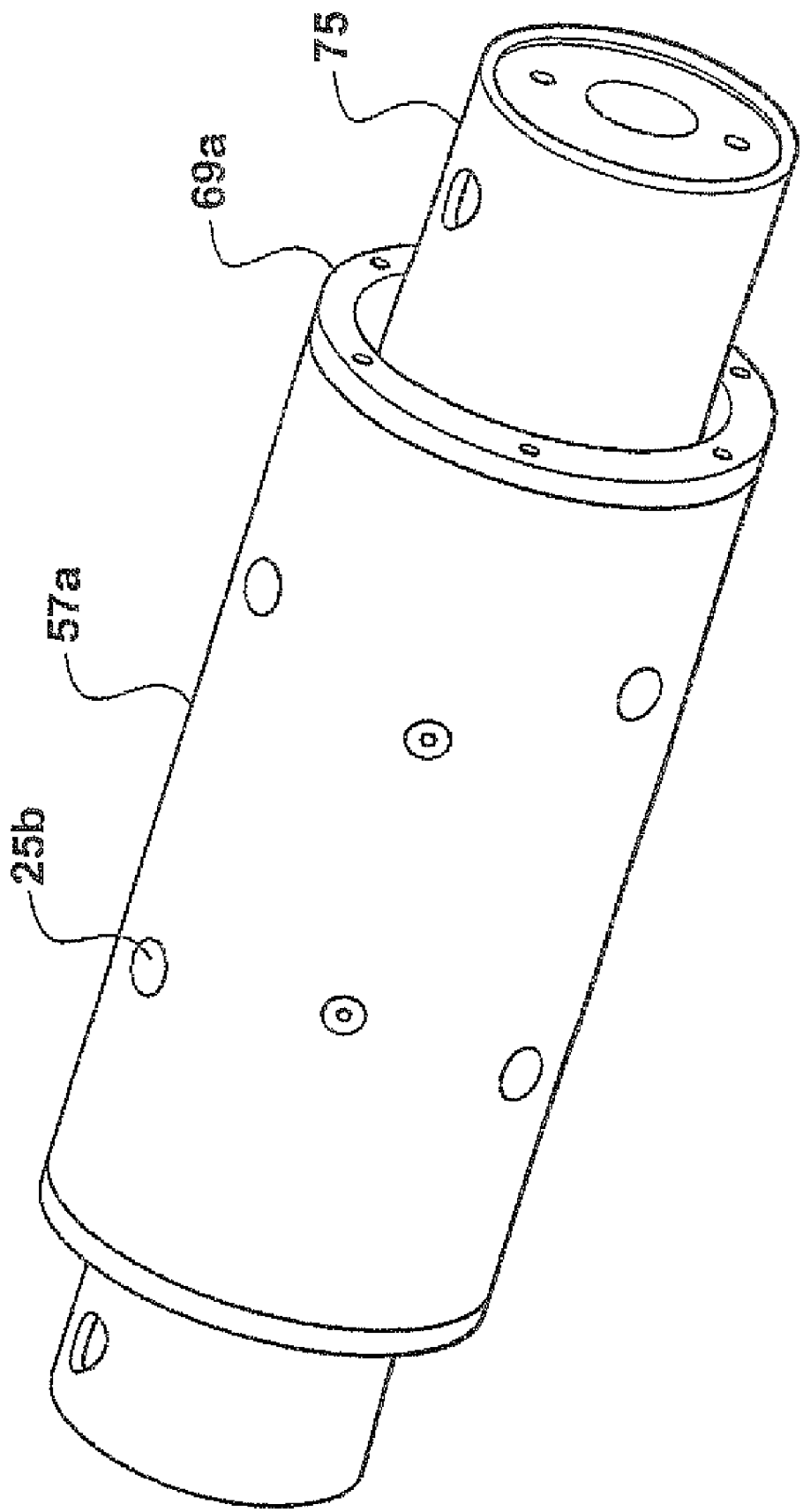

With reference to FIG. 15 the outer portion of the output sleeve (57*a*) is shown installed and mated with the bearing retaining rings (69*a*).

Figure 16:
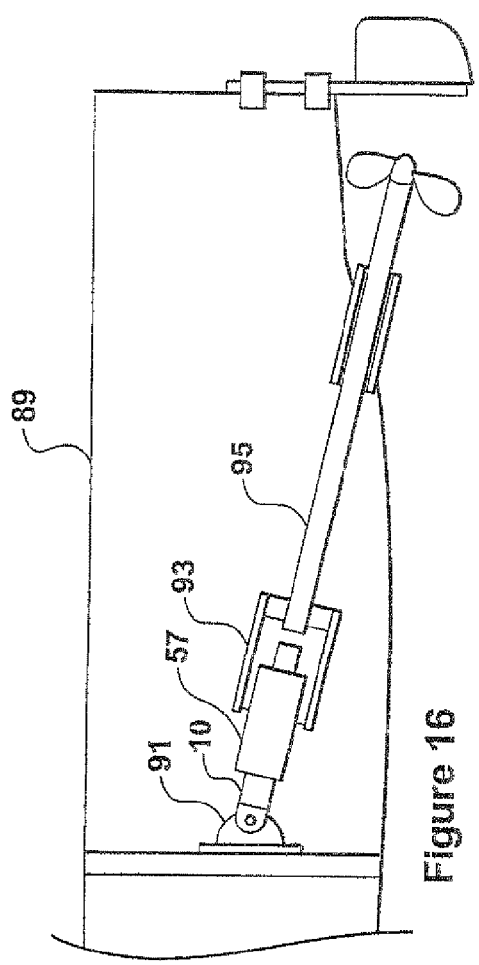

With reference to FIG. 16 the engine assembly (10) is shown fitted for example to a boat (89). In this example the engine assembly is fitted to an engine mount fitting (91) mounted on a bulkhead within the boat. A coupling (93) connects the output sleeve (57) to the propeller shaft (95) of the boat (89). It can be seen that such an arrangement provides a compact in-line marine engine configuration.

Figure 17:
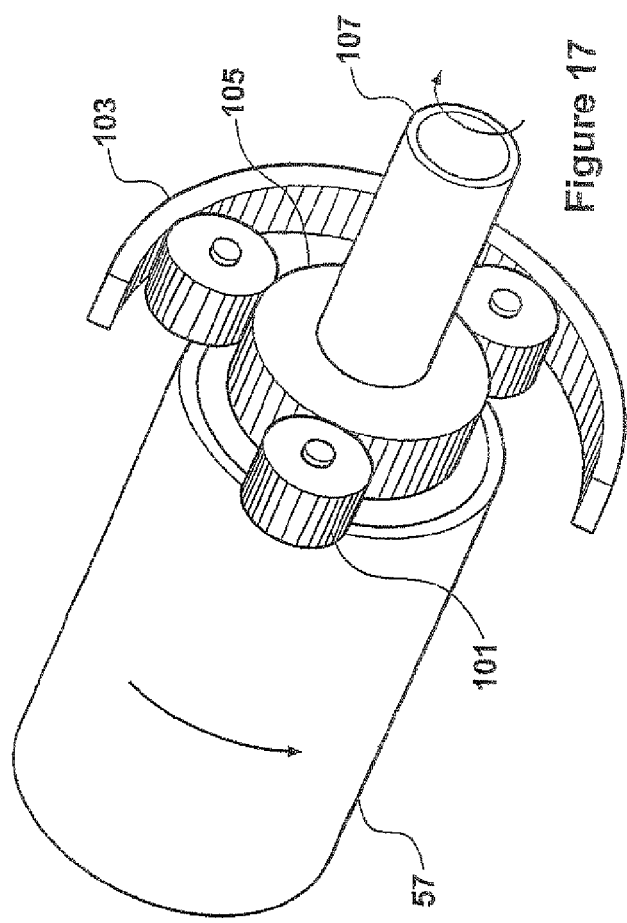

With reference to FIG. 17 the engine assembly (10) is shown coupled with a gearing system. In this example the output sleeve (57), or an extension of is causing three planetary gears (101) to orbit within a fixed ring gear (103), the planetary gears (101) also being engaged to a sun gear (105) which is fixed to one end of an output shaft (107). The fixed ring gear (103) is shown partially cut way. Such an arrangement can be used to provide a compact step-up gearing system that can be used to increase the output shaft (107) speed over the engine operating speed. In a case where the engine assembly (10) has a large number of peaks or lobes on the output sleeve (57), and has many power strokes per revolution, a step-up gearing system would be advantageous in some applications. Clearly alternative gearing and drive systems can be used.

Figure 18:
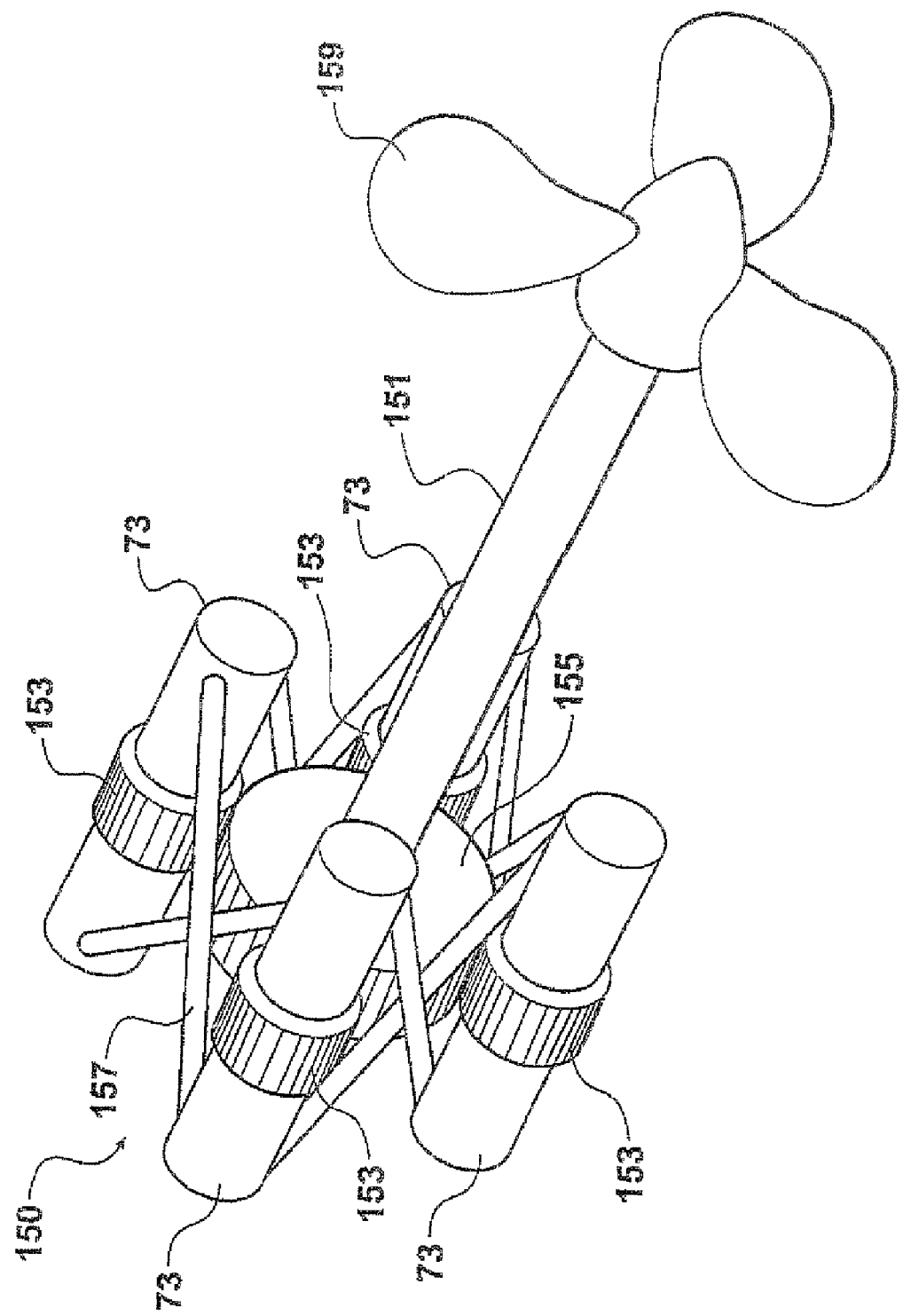
FIG. 18 is a schematic perspective view of an engine assembly incorporating a number of individual opposed twin reciprocating sleeve engine units.

With reference to FIG. 18 an engine assembly (150) having four reciprocating sleeve engines (73), as described above, situated about an output shaft (151) is shown in a schematic drawing. A gear wheel (153) is mounted on the output sleeve (57) of each engine (73) and is driven by the output sleeve (57). Each gear wheel (153) engages with an output gearwheel (155) which is attached to the output shaft (151). In this way, the four engines (73) combine to drive the output shaft (151).

The individual engines (73) are mounted on a support structure (157) to make up the engine assembly (150). While the support structure (157) is illustrated using a network of struts in this example, the individual engines (73) could alternatively be supported within a cylindrical support structure, which in turn could be mounted to the structure of a ship, or any malllller of other supporting structures.

This example shows an engine assembly (150) having four individual engines (73), but it is envisaged that any number of engines (73) could be used, depending on the space about the output gearwheel (155) and the number of output gearwheels (155). While the example shown has four equally spaced engines (73), it is envisaged that the engines (73) could be spaced apart or grouped to suit any particular installation requirements.

Such an engine assembly (150) can be used as a marine engine in a ship, to drive a propeller (159). The advantage of such an engine configuration is that a large number of power strokes can be made for each single revolution of the propeller (159). For example, if each engine (73) had a 12 lobe curved track on their respective output sleeves, and there was a six to one reduction gearing ratio between each gear wheel (153) and the output gearwheel (155), the engine could produce 576 power strokes per revolution of the engine. The figure of 576 is calculated as follows: 12 lobes means 24 power strokes per revolution of each engine (73), this 24 power strokes is multiplied by 4 since there are 4 engines (73) in the complete engine assembly (150) giving 96 power strokes, and the 6:1 reduction gearing means 6×96, or 576 power strokes per single revolution of the propeller (159). In a marine engine situation where it is important to provide a very large power input to a propeller, but where it is important to do so at a very low rotational speed, such an engine assembly (150) would be advantageous. The use of such an engine assembly could eliminate or reduce the need for a reduction gearbox in a marine drive system.

This engine assembly (150) adds the power output from a number of combustion cylinders in a parallel manner, as opposed to a series addition which is used in a multi-cylinder in-line engine. That is, in an in-line engine, each cylinder adds torque to a single crankshaft. The crankshaft at the output end of the engine must carry all of the combined torque from each of the cylinders, requiring a large and heavy crankshaft if the engine has a large number of combustion cylinders. If more power is required and additional combustion cylinders are added, the crankshaft torque-requirements become even greater. In contrast, using an engine assembly (150) design as described herein, the power output can be increased by providing additional engines (73) about the output gearwheel (155), and while the output gearwheel (155) must be designed to cope with the increased torque, the components of each individual engine (73) does not need to be strengthened in any way. Such an engine assembly (150) can therefore achieve size and weight savings as compared to a conventional in-line engine.

Another advantage of the engine assembly (150) is that individual engines (73) can be removed and/or replaced as required for maintenance purposes. This gives greater flexibility in the manner that the engine assembly (150) is used and maintained when compared to conventional in-line engines.

Figure 19:
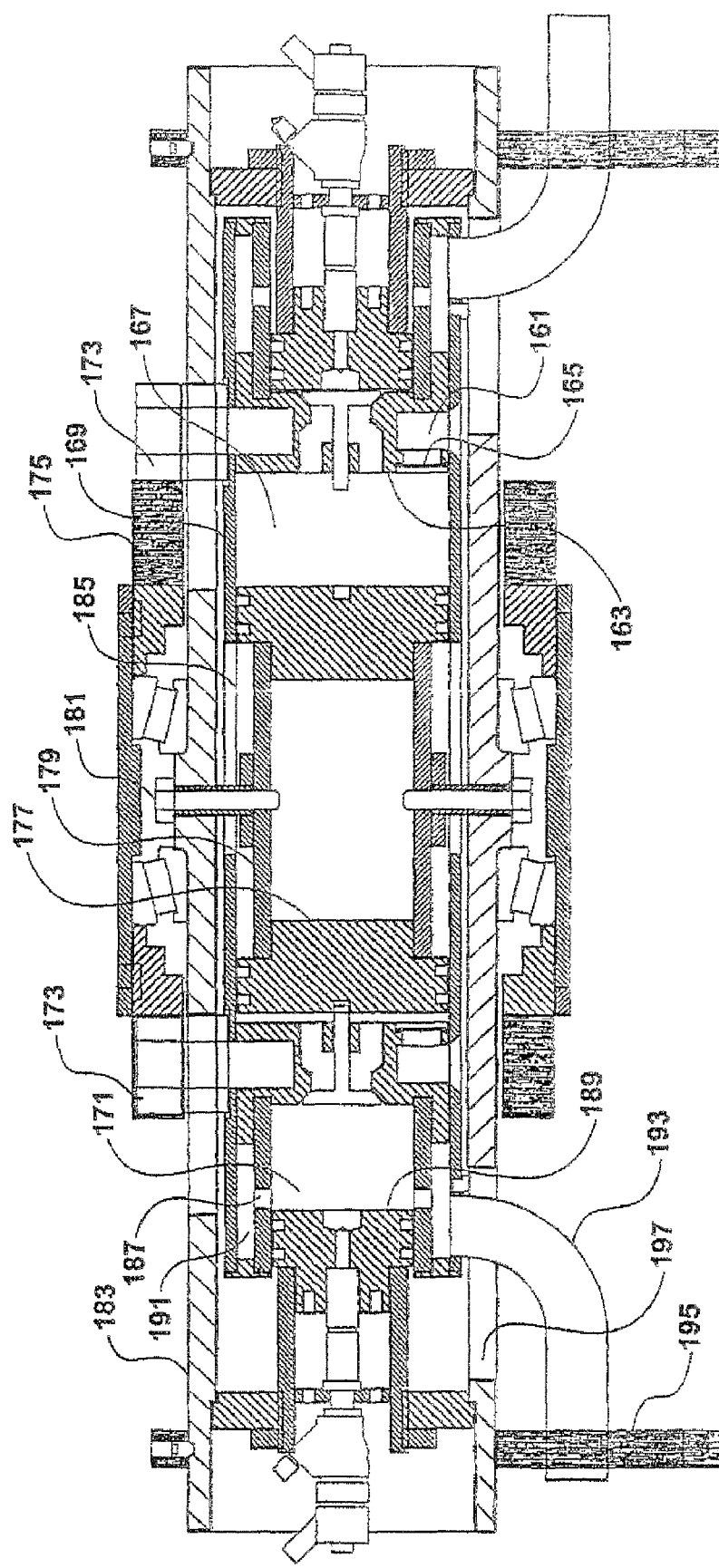
FIG. 19 is a cross sectional view of a twin combustion chamber single reciprocating sleeve engine.

With reference to FIG. 19 a twin combustion chamber single reciprocating sleeve example of the engine is shown. The construction and operation of this engine is similar in many respects to that shown with reference to FIGS. 9 to 15. The primary differences being: the inlet porting and valve system, the use of a single reciprocating sleeve, and the exhaust ducting. Each of these aspects are discussed as follows.

In this example the inlet port (161) is positioned in the intermediate bulkhead (163) and the port is controlled by a one-way valve (165). An advantage of this type of inlet valve is that it can be pressure operated and air can begin to enter the pre-charge chamber (167) as soon as the pressure within this chamber drops below ambient pressure.

The single reciprocating sleeve (169) operates about two first static pistons (189) and two second static pistons (177). The single reciprocating sleeve (169) also defines two pre-charge chambers (167) and two combustion chambers (171), and has rollers (173) attached towards both ends. The advantage of this single reciprocating sleeve (169) being that the rollers (173) engage the output sleeve (175) at both ends and therefore the rollers (173) cannot leave the curved track on either end of the output sleeve (175).

It can be seen that the two second pistons (177) are supported on a tubular structure (179) which is supported by bolts (181) from the static sleeve (183). A number of slots (185) are provided in the reciprocating sleeve (169) to allow the sleeve to clear the bolts (181) as the sleeve reciprocates.

In this engine the single reciprocating sleeve (169) is configured such that a peak on one end corresponds to a trough at the other end. This means that when the combustion chamber (171) at one end is experiencing a power stroke, the sleeve (169) is able to transmit force directly to assist with the induction of air into the pre-charge chamber (167) of the opposing pre-charge chamber/combustion chamber pair.

The example shown is not dynamically balanced, however good dynamic balancing can be achieved by constructing an engine assembly having two or more of engine units shown, each unit being arranged and synchronised to balance the forces generated by the other. For example, two such units could be placed in line, or four such units could be arranged in an engine configuration as shown in FIG. 18.

In this example the reciprocating sleeve (169) includes a number of exhaust ports (187) which allow the exhaust gases to escape from the combustion chambers (171) when these ports clear the first pistons (189). Escaping exhaust gases are collected in an annular chamber (191) and then exit the engine via an exhaust pipe (193). The exhaust pipes (193) reciprocate with the reciprocating sleeve (169) and pass through clearance holes in a pair of engine stands (195). The exhaust pipes (193) also travel within clearance slots (197) in the static sleeve (183).

Variations

While the engine in the examples uses diesel fuel, other fuels such as any hydrocarbon fuel or hydrogen could be used, and an ignition plug could be added to the crown of the first piston to provide ignition if required.

The examples describe an engine having a single or a double reciprocating sleeve, but clearly any number of sleeve and piston assemblies can be incorporated into a single engine assembly, to suit power or balancing requirements.

Definitions

Throughout this specification the word "comprise" and variations of that word, such as "comprises" and "comprising", are not intended to exclude other additives, components, integers or steps.

Advantages

Thus it can be seen that at least the preferred form of the invention provides a reciprocating engine which operates with a two stroke cycle, but does not require oil to be mixed in with the fuel for engine lubrication.

Also, the reciprocating engine has improved breathing over traditional two stroke engines, and more efficient purging of the exhaust gases can be achieved.

And, in addition, the method by which the reciprocating motion is converted into rotary motion, by the use of an output sleeve having a curved track on one or both ends, allows greater flexibility in the way in which power is extracted during the power stroke. That is, the curved track can be optimised so that the forces produced by the sleeve during the power stroke can be most efficiently turned into rotary motion. The conversion of reciprocating motion into rotary motion is no longer constrained by mechanical linkage to the circular motion of a crank shaft.

The invention claimed is:

1. A reciprocating engine, comprising;
  a pair of stationary and substantially concentrically aligned mutually opposed pistons separated by a sleeve adapted to reciprocate about the pistons, the reciprocating sleeve defining two cavities, each cavity being operatively connected to one of the pistons to define a chamber, the first chamber being a pre-charge chamber and having at least one inlet port, and the second chamber being a combustion chamber and having at least one outlet port, the two chambers being separated by a transfer valve,
  wherein the transfer valve is pressure operated, and
  wherein the outlet port for the combustion chamber comprises a port in the reciprocating sleeve which is so sized and positioned that the port can be closed by a piston during at least part of the travel of the reciprocating sleeve.

2. A reciprocating engine as claimed in claim 1, wherein the pre-charge chamber has a larger diameter than the combustion chamber.

3. A reciprocating engine as claimed in claim 1, wherein the transfer valve is biased toward a closed configuration by a biasing means.

4. A reciprocating engine as claimed in claim 3, wherein the biasing means includes a spring.

5. A reciprocating engine as claimed in claim 1, wherein the engine is configured to operate using a two stroke cycle.

6. A reciprocating engine as claimed in claim 1, wherein the inlet port for the pre-charge chamber is provided with a pressure operated valve.

7. A vehicle or craft incorporating a reciprocating engine substantially as claimed in claim 1.

8. A reciprocating engine comprising;
  two pairs of stationary and substantially concentrically aligned mutually opposed pistons, each pair of opposed pistons separated by a sleeve adapted to reciprocate about the pistons, each reciprocating sleeve defining two cavities, each cavity being operatively connected to one of the pistons to define a chamber, a first chamber of each pair being a pre-charge chamber and having at least one inlet port, and a second chamber of each pair being a combustion chamber and having at least one outlet port, the two chambers of each pair being separated by a transfer valve,
  wherein each transfer valve is directly operated by pressure within its associated pre-charge and combustion chambers and each transfer valve is only opened when the pressure within its associated pre-charge chamber exceeds the pressure within its associated combustion chamber, and
  wherein the outlet port for each combustion chamber comprises a port in its associated reciprocating sleeve which is so sized and positioned that the port can be closed by a piston during at least part of the travel of each reciprocating sleeve.

9. A reciprocating engine as claimed in claim 8, wherein each transfer valve is biased toward a closed configuration by a biasing means.

10. A reciprocating engine as claimed in claim 9, wherein each biasing means includes a spring.

11. A reciprocating engine as claimed in claim 8, wherein the engine is configured such that each reciprocating sleeve operates in a mutually opposing direction to the other when the engine is in use.

12. A reciprocating engine as claimed in claim 8, wherein the engine is configured to operate using a two stroke cycle.

13. A reciprocating engine as claimed in claim 8, wherein each inlet port for each pre-charge chamber is provided with a pressure operated valve.

14. A reciprocating engine as claimed in claim 8, wherein each pre-charge chamber has a larger diameter than its associated combustion chamber.

15. A vehicle or craft incorporating a reciprocating engine substantially as claimed in claim 8.

* * * * *